United States Patent [19]

Chang

[11] Patent Number: 4,889,972
[45] Date of Patent: Dec. 26, 1989

[54] MULTI-FUNCTIONAL ELECTRICALLY ACTIVATED STOVE

[76] Inventor: Chia C. Chang, No. 169, Sec. 2, Ho Tso Rd., Tu Tso Li, Ho Met, Chen. Chang Hua Hsien, Taiwan

[21] Appl. No.: 231,352

[22] Filed: Aug. 11, 1988

[51] Int. Cl.$^4$ .......................... A47J 27/00; H05B 3/42
[52] U.S. Cl. .................................... 219/472; 219/438; 99/339
[58] Field of Search ............... 219/472, 474, 436, 438; 99/484, 339, 340

[56] References Cited

U.S. PATENT DOCUMENTS

| | | | |
|---|---|---|---|
| 2,059,133 | 10/1936 | Merrit | 219/474 |
| 2,949,525 | 8/1960 | Dunn | 99/339 |
| 3,096,706 | 7/1963 | Cardwell | 99/340 |
| 3,623,422 | 11/1971 | Marshall | 99/340 |

*Primary Examiner*—Teresa J. Walberg
*Attorney, Agent, or Firm*—Morton J. Rosenberg; David I. Klein

[57] ABSTRACT

A multi-functional electrically activated stove which includes a stove housing (10) defining an upper concave housing (11) and a similarly formed concave housing above and below a heat conducting board (12) having mounted thereon an electrical heating tube (13). The heat conducting board includes a plurality of apertures (121) to allow radiant heat to pass to the lower housing chamber in an efficient manner. The stove housing (10) includes an opening (17) formed in a frontal wall for reversible insert of a lower grill member (20) having webs (21) formed thereon for positioning foodstuffs. Insertable within the upper concave housing (11) is an upper baking member (30), a flat pan member (40), and a steam plate (50) which is mountable within the flat pan member (40). A stove cover (60) is mountable over the stove housing (10) to provide for a closed internal chamber.

1 Claim, 3 Drawing Sheets

MULTI-FUNCTIONAL ELECTRICALLY ACTIVATED STOVE

BACKGROUND OF THE INVENTION

This invention is directed to a multi-functional electric stove. In particular, this invention relates to an electric stove which efficiently utilize electrical energy to heat an electric heating tube and to allow steaming, boiling, frying, and roasting simultaneously and in an efficient manner.

Still further, this invention directs itself to a multi-functional electric stove having an electric heating tube which provides heating in both an upper and a lower housing chamber.

Electric heating tubes of many prior art electric stoves are located beneath such electric stoves. Heat radiated from such prior art stoves is radiated from the electric heating tube and spreads in all directions. Therefore, downwardly directed radiant heat cannot be used efficiently to bake and roast. Further, in many cases, ordinary electrical appliances are only mono-functional, consequently, it is necessary to use different kinds of electric appliances dependent upon the needs of the user in steaming, boiling, frying and roasting. Use of such electrical appliances has increased energy costs and cooking time.

Although functionally such prior art electrical appliances are acceptable, they are not able to simultaneously provide for a wide variety of cooking functions.

SUMMARY OF THE INVENTION

A multi-functional electrically activated stove which includes a stove housing having a heat conducting planar member defining an upper housing chamber and a lower housing chamber. The heat conducting planar includes an electrically conducting tube member positioned adjacent an upper surface of the heat conducting planar member. A lower grill member is insertable into the lower housing chamber through an opening formed in the stove housing below the heat conducting planar member. The lower grill member includes a plurality of web members for positioning foodstuffs thereon. An upper baking member defines a mesh screen framework having a plurality of hook members which extend therefrom for releasably coupling such to a boundary edge of a wall of the upper housing chamber. The upper baking member is mounted above the electrically conducting tube member. A pan member is reversibly insertable within the upper housing chamber. A steam plate member having openings formed therethrough is provided with the steam plate member having a plurality of downwardly depending legs for interfacing and locating the steam plate member on the pan member. The steam plate member includes a handle member secured to an upper surface thereof. The multi-functional electrically activated stove further includes a cover member removable from the stove housing for defining a closed housing. The cover member is formed of a substantially transparent plastic composition.

DESCRIPTION OF THE PREFERRED EMBODIMENTS

Figure 1:
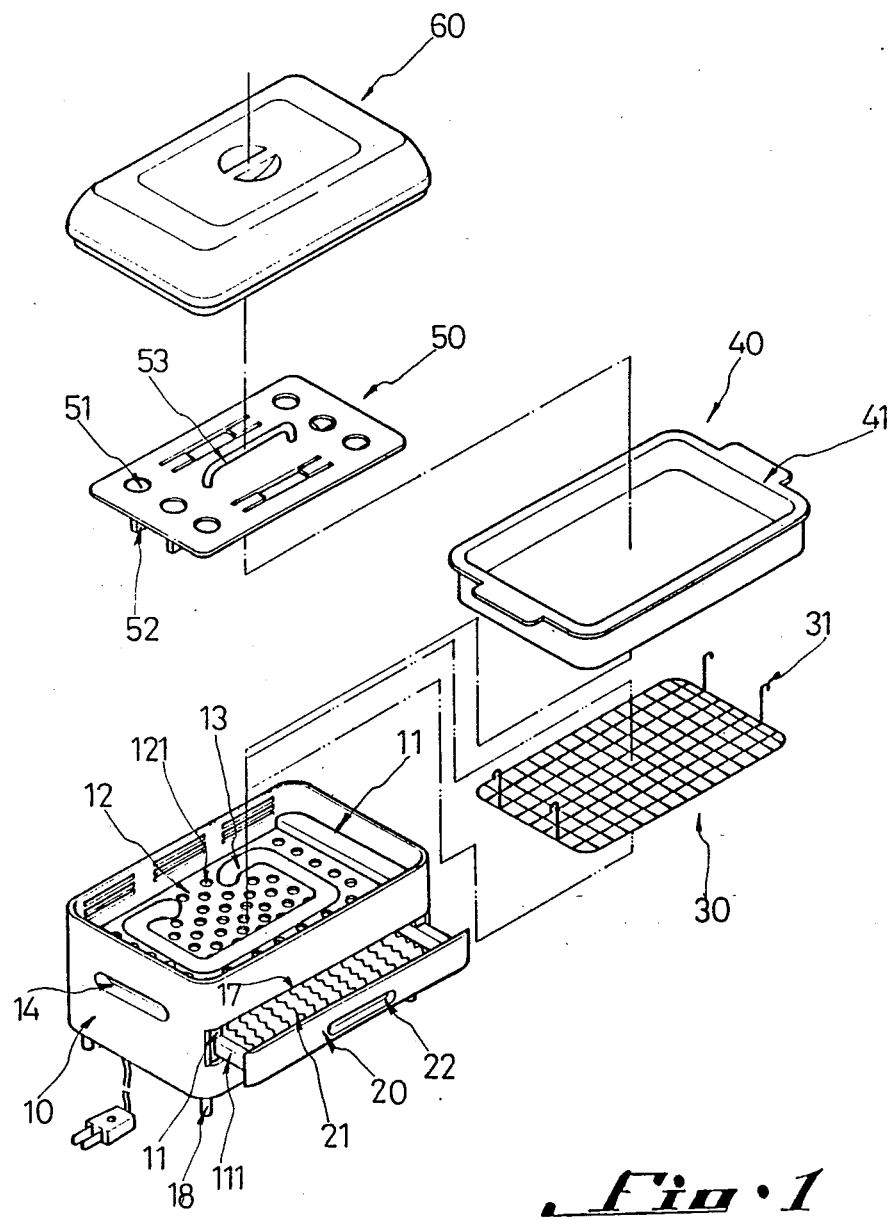
FIG. 1 is a perspective exploded view of the multi-functional electrically activated stove.
Figure 2:
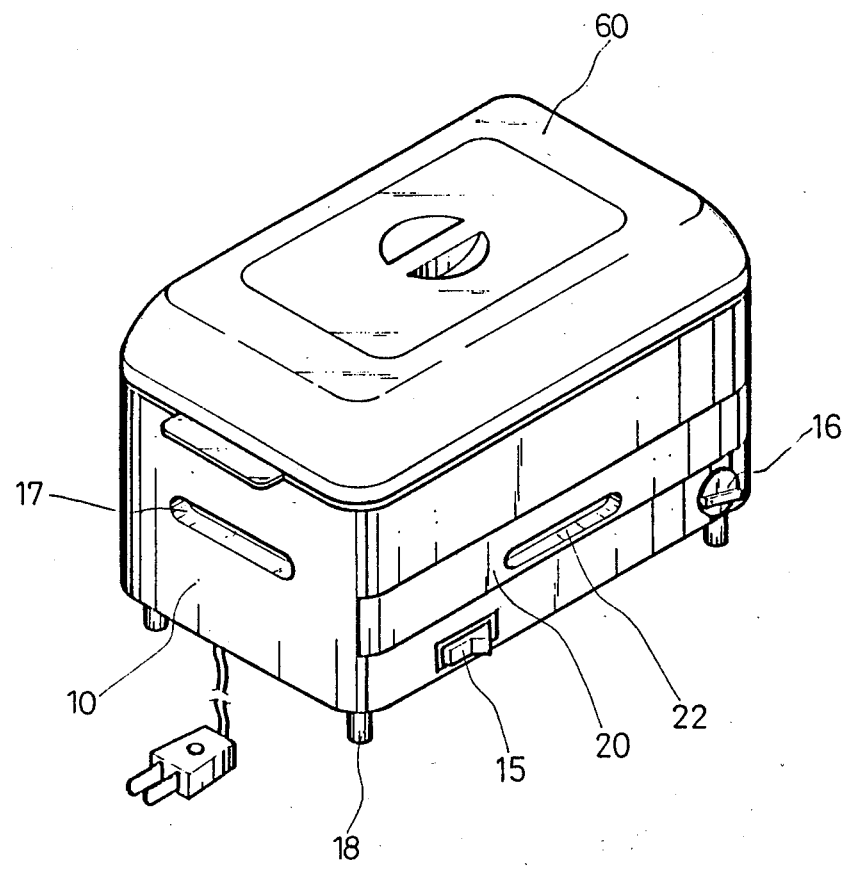
FIG. 2 is a perspective view of the multi-functional electrically activated stove; and, FIG. 3 is a sectional view of the multi-functional electrically activated stove shown in an exploded elevational view.
Figure 3:
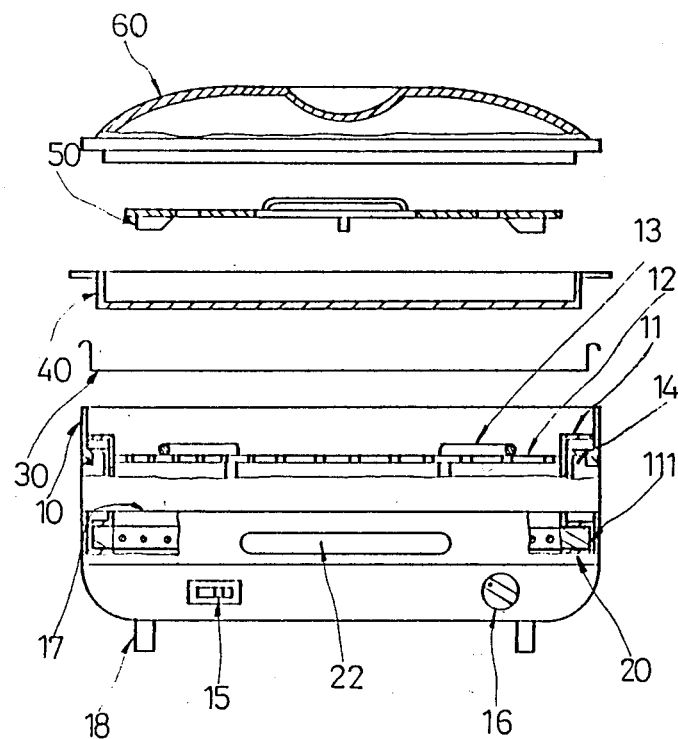

Referring now to FIGS. 1-3, there is provided a multi-functional electrically activated stove unit including stove housing 10 having a heat conducting planar member 12 defining an upper concave housing chamber 11 and a lower concave housing chamber positionally located below heat conducting planar member or heat conducting board 12. Electric heating tube or coil 13 is mounted on an upper surface of heat conducting board member 12, as is shown in FIG. 1. Heat conducting board 12 includes a plurality of apertures 121 formed therethrough for efficiently allowing radiant heat to pass to the lower housing chamber for purposes to be described in following paragraphs. Thus, radiant heat from electrical heating tube member 13 may pass freely into upper concave housing 11 or to the similarly contoured lower housing of overall stove housing 10. Heating tube or coil 13 is electrically activated in the standard manner and is coupled to an electrical outlet through an electrical plug member.

Openings 14 are provided on opposing wall members of stove housing 10 in order to allow housing 10 to be grasped and moved by a user.

As shown in FIG. 2, multi-functional electrically activated stove includes a power switch 15 for electrically activating or deactivating electrical heating tube 13. Additionally, there is a time or temperature control switch 16 of standard commercially available types which may control the time duration of the electrical activation of heating tube 13, or may be a standard thermostat to control temperature within stove housing 10. Stove housing 10 includes a multiplicity of stove legs 18 for placement on an external base surface.

Opening 17, as is shown in FIG. 1, is formed through a frontal surface of stove housing 10 to allow insert of lower grill member 20. Lower grill member 20 is insertable into the lower housing chamber through opening 17 in a reversible manner below heat conducting planar member 12. Lower grill member 20 includes a plurality of grill webs 21 for mounting foodstuffs thereon to be heated by radiant energy emitted from electrical heating tube 13. Lower grill member 20 includes side frame members 111 which provide an overall framework for lower grill member 20. Additionally, recess 22 is formed in a frontal wall of lower grill member 20 to allow manual insert and retraction of lower grill member 20 from internal stove housing 10 through opening 17. Webs 21 allow for toasting of bread or other like foodstuffs.

Upper baking member 30 is formed of a mesh type screen or a web structure and defines a substantially planar member. Upper baking member 30 includes a plurality of hook members 31 extending in a vertical direction from the planar upper baking member 30 for releasable coupling to a boundary edge of a wall of upper concave housing 11. Upper baking member 30 when inserted within upper housing chamber 11 is mounted above electrically conducting heating tube member 13.

A pan member 41 having a convex contour is mountable within upper concave housing 11 as is shown in FIG. 3 and includes a pair of handle sections 41 which extend from opposing transverse sides for interfacing with an upper edge of stove housing 10. Pan member 40 may be used for frying or boiling foodstuffs contained therein.

Steam plate member 50 having openings 51 formed therethrough is utilized to hold steaming foodstuffs wherein openings 51 allow steam to pass therethrough. Steam plate member 50 is mountable within pan member 40 and includes a plurality of leg members 52 for removably mounting therein. Steam plate member 50 includes a handle bar member 53 extending upwardly from an upper surface to allow ease of manipulation by a user. Cover member 60 is removable from stove housing 10 for defining a closed internal housing chamber. Cover member 60 may be formed of a substantially transparent plastic composition and includes an inward concave handlebar for ease of manipulation by a user.

Multi-functional electrically activated stove provides for a compact storage volume where the components such as the lower grill member 20, upper baking member 30, flat pan 40, and steam plate 50 may all be inserted internal to stove housing 10. Thus, the overall stove configuration defines a small volume which is advantageous.

By providing a centrally positioned heat conducting board member 12 with an electrically heating tube 13 mounted thereon, and further in combination with an upper and lower housing chamber, radiant heat may be efficiently and directly provided in an even manner above and below heating board 12. Additionally, multi-functional electrically activated stove may be used for baking, roasting, steaming, boiling, and frying differing kinds of foodstuffs. Additionally, simultaneous heating may be provided wherein a user may steam eggs and toast bread at the same time while utilizing the radiant energy in a most efficient manner.

What is claimed is:

1. A multi-functional electrically activated stove comprising:

a stove housing having a heat conducting planar member defining an upper housing chamber and a lower housing chamber, said heat conducting planar member having an electrically conducting tube member positioned adjacent an upper surface thereof, a lower grill member insertable into said lower housing chamber through an opening formed in said stove housing below said heat conducting planar member, said lower grill member having a plurality of web members for positioning foodstuffs thereon;

an upper baking member defining a mesh screen framework having a plurality of hook members extending therefrom for releasable coupling to a boundary edge of a wall of said upper housing chamber, said upper baking member being mounted above said electrically conducting tube member;

a pan member insertable within said upper housing chamber;

a steam plate member having openings formed therethrough, said steam plate member having a plurality of downwardly depending legs for interfacing and locating said steam plate member on said pan member, said steam plate member having a handle member secured to an upper surface thereof; and, a cover member removable from said stove housing for defining a closed housing, said cover member being formed of a substantially transparent plastic composition.

* * * * *